United States Patent [19]

Geist et al.

[11] Patent Number: 4,769,400

[45] Date of Patent: Sep. 6, 1988

[54] HEAT-CURABLE BINDER MIXTURE

[75] Inventors: Michael Geist, Münster; Günther Ott, Münster-Wolbeck; Georg Schön, Everswinkel, all of Fed. Rep. of Germany

[73] Assignee: BASF Farben + Fasern AG, Muenster, Fed. Rep. of Germany

[21] Appl. No.: 890,988

[22] Filed: Jul. 30, 1986

Related U.S. Application Data

[63] Continuation-in-part of Ser. No. 653,247, filed as PCT DE84/00074 on Mar. 30, 1984, published as WO84/04099 on Oct. 25, 1984, abandoned.

[30] Foreign Application Priority Data

Apr. 9, 1983 [DE] Fed. Rep. of Germany ....... 3312814

[51] Int. Cl.$^4$ .......................... C09D 3/48; C09D 3/58; C09D 5/40; B05D 3/02
[52] U.S. Cl. .................... 523/408; 523/409; 523/411; 523/412; 523/414; 523/415; 525/113; 525/117; 525/118; 525/119; 525/176; 525/217; 525/228; 525/230; 525/385; 525/438; 525/444; 525/526; 525/530; 525/536; 525/223; 526/320
[58] Field of Search ................ 525/223, 113, 117–119, 525/176, 217, 228, 230, 385, 438, 440, 526, 530, 533, 536; 523/408, 409, 411, 412, 414, 415; 526/320

[56] References Cited

U.S. PATENT DOCUMENTS

| | | | |
|---|---|---|---|
| 3,917,573 | 11/1975 | Parekh | 525/327.7 |
| 3,954,719 | 5/1976 | Pirck et al. | 525/375 |
| 3,960,983 | 6/1976 | Blank | 525/495 |
| 4,069,275 | 1/1978 | Labana et al. | 523/223 |
| 4,238,577 | 12/1980 | Arendt | 525/223 |
| 4,246,089 | 1/1981 | Hazifn | 525/530 |
| 4,255,547 | 3/1981 | Arendt | 526/321 |
| 4,303,560 | 12/1981 | Takahashi et al. | 525/223 |
| 4,362,847 | 12/1982 | Kooljamans et al. | 525/526 |
| 4,405,763 | 9/1983 | Kooymans et al. | 525/533 |
| 4,434,278 | 2/1984 | Skiscim | 525/530 |
| 4,460,746 | 7/1984 | Fock et al. | 525/119 |
| 4,539,385 | 9/1985 | Geist et al. | 525/384 |

FOREIGN PATENT DOCUMENTS

| | | | |
|---|---|---|---|
| 0086790 | 7/1978 | Japan | 526/320 |
| 2067571 | 7/1981 | United Kingdom | 525/119 |

Primary Examiner—Herbert J. Lilling
Attorney, Agent, or Firm—Gilbert L. Wells

[57] ABSTRACT

The invention relates to a heat-curable binder mixture which comprises an organic synthetic resin A and a crosslinking agent B. Said synthetic resin A can be an epoxy resin, a polyester resin or an acrylate resin having a number average molecular weight of 500 to 20,000 and at least 0.2 equivalent per 100 g of resin of primary and/or secondary amino groups and/or hydroxyl groups, and said crosslinking agent B is an organic compound having at least 2 β-alkoxyalkyl ester groups per molecule.

11 Claims, No Drawings

HEAT-CURABLE BINDER MIXTURE

This application is a continuation-in-part of application Ser. No. 653,247, filed as PCT DE84/00074 on Mar. 30, 1984, published as WO84/04099 on Oct. 25, 1984, now abandoned.

BACKGROUND OF THE INVENTION

The invention relates to a heat-curable binder mixture comprising an organic synthetic resin A and a crosslinking agent B.

Various chemical reactions have been proposed and are indeed used for curing the binders in paint films by crosslinking. The chemical bonds formed in the course of the crosslinking reaction frequently do not meet all the demands which are made on the paint films.

Electropainting has in recent years become widely established as a method of priming electrically conductive substrates. Interest has hitherto concentrated on anodic electropainting. The resin binders used for this purpose belong to the carboxyl-containing resins, for example to the maleate oils, maleated epoxy resins, alkyd resins, acrylic resins and in particular to the maleated polybutadienes. These resins were water-solubilized by salt formation, chiefly with amines, and were electrodeposited in the electrocoating bath at the anode. The anodic electropriming process, however, has serious disadvantages. For instance, oxygen evolves at the anode in the course of the electrodeposition and can have a serious, adverse effect on the resins being deposited at the anode. Furthermore, metal ions pass into solution at the anode and end up as flaws in the baked film. The metal ions can be the cause of discoloration and spotting. They are in particular responsible for qualitative disadvantages as a result of salt formation, which reduces the resistance to water and the level of corrosion protection.

The cathodic electropriming process, which has come of age, commercially, in recent years, is increasingly displacing the anodic process, since the deficiencies described above are largely avoided. For instance, the gas which evolves at the cathode—where the paint film is now deposited—is hydrogen, which has no effect on the resin binder. Since cathodic deposition can take place at approximately neutral pH virtually no metal ions go into solution. The binders suitable for cathodic deposition mainly contain amino groups, which are neutralized with acids to achieve water-solubilization.

SUMMARY OF THE INVENTION

It is the object of the invention to provide a binder mixture for preparing coating agents which produce surface coatings having good technical properties. The binder mixture of the invention shall help to reduce the environmental pollution accompanying the application of the corresponding coating agents. Furthermore, the coating agents based on the binder mixture according to the invention shall be suitable for any type of application process, ie. it should be possible to use the binder mixture for baking finishes which are applied conventionally, for powder finishes, for aqueous powder slurries, and for electrocoating baths. Furthermore the binder mixture shall have improved reactivity and, if used for aqueous systems, improved dispersion stability.

This object is achieved in an inventive manner for a binder mixture of the type specified at the outset when synthetic resin A is free of epoxy groups and is an epoxy resin, polyester resin or acrylate resin having a number average molecular weight of 500 to 20,000 and at least 0.2 equivalent per 100 g of resin of primary and/or secondary amino groups and/or hydroxyl groups, and crosslinking agent B is an organic compound having at least 2 β-alkoxyalkyl ester groups per molecule.

The binder mixture, in addition to components A and B, advantageously contains, as component C, pigments, fillers, crosslinking catalysts, corrosion inhibitors and further paint auxiliaries.

Advantageously the proportion of component A is 40–95% by weight and that of component B is 5–60% by weight, the total amount of components A and B being 100%.

In the course of baking, then, the β-alkoxyalkyl ester groups of component B react with the primary and/or secondary amino groups and/or hydroxyl groups of component A to form an amide bond and/or ester bond. The basic nitrogen of the amino group of the resin of component A is thus converted in the baked film into a pH-neutral amide nitrogen. The baked film thus contains no basic flaws. The principle of the crosslinking mechanism is described in the following reaction equation:

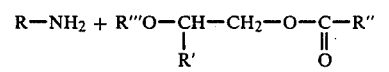

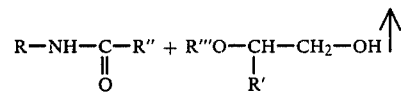

The hydroxyl groups react with the β-alkoxyalkyl ester groups in analogous manner:

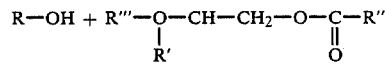

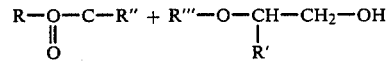

These crosslinking reactions are critically favored in the design according to the invention by the −I-effect of the alkoxy group which is in β-position relative to the ester group of the crosslinking agent. Moreover, the β-positioned alkoxy oxygen and its neighboring group effect come in particularly useful in the metalcatalyzed aminolysis or alcoholysis. Furthermore, the β-hydroxyalkyl ethers which are split off have a boiling point such that they advantageously act as flow-control agents during the baking.

European Patent No. 12,463 describes a similar crosslinking mechanism in which, however, during baking hydroxyl groups react with β-hydroxyalkyl ester groups, the eliminated products being 1,2-diols. These, as any skilled worker will now, have a high boiling point. For instance, butane-1,2-diol, with a molecular weight of 90, has a boiling point of 192° C. In contrast, isomeric 2-ethoxyethanol has a boiling point of 135° C.

If the eliminated products remain in or on the baked film the subsequent application of finish can give rise to intermediate adhesion problems. These problems are likewise bypassed by means of the binders according to the invention. The amide bond formed during baking has a very advantageous effect on the adhesion of the film, in particular to metal substrates. The resilience of the film is thereby similarly increased. This crosslinking mechanism confers high resistance of the paint film to solvents, alkalis and salt spray mist. Even on sheet metal which has not been pretreated the films form very resistant coatings even without corrosion inhibitors.

DESCRIPTION OF THE PREFERRED EMBODIMENTS

Component A of the binder mixture has a number average molecular weight of 500 to 20,000, preferably 600 to 10,000.

Component A is an organic resin having primary and/or secondary amino groups and/or hydroxyl groups. Tertiary amino groups may be additionally present as well.

The chemical nature of synthetic resin A is not critical. It can be chosen according to the required properties of the binder mixture. For instance, it can be an epoxy resin, a polyester resin or an acrylate resin. The significant point is that the resins have a sufficient number of primary and/or secondary amino groups and/or hydroxyl groups which are capable of reacting with crosslinking agent B in accordance with the mechanism described above.

The primary and/or secondary amino groups are preferably introduced into the organic resin, in the preparation of component A, by reacting a polyamine and/or an amino- and/or hydroxyl-containing ketimine with resins which contain at least one, preferably at least two, epoxy groups or isocyanate groups per molecule.

The hydroxyl groups are advantageously introduced into these binders via secondary (hydroxyalkyl)alkylamines or dihydroxyalkylamines.

It has been found that component A can be prepared in a particularly suitable manner with epoxy-containing resins having preferably terminal epoxy groups and being a member of the group consisting of polyglycidyl ethers, polyglycidyl esters and polyglycidylamines.

The epoxy-containing resin can advantageously also be a copolymer of glycidyl acrylate and/or methacrylate or any other glycidyl-bearing olefinically unsaturated polymerizable compound with alkyl and/or hydroxyalkyl esters of acrylic and/or methacrylic acid and/or vinyl compounds such as styrene, vinyltoluene or vinylcarbazole.

Partially epoxidized polybutadiene oils are another particularly suitable group of resins.

For the purposes of this invention, polyglycidyl ethers preferably have the general formula

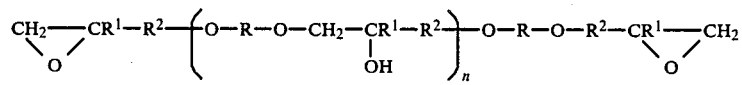

where

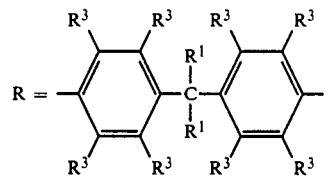

$R^1 = H$ or $C_nH_{2n+1}$
$R^2 = (CR_2^1)_n$
$R^3 = R^1$, halogen and preferably H
$n = 0$ to 5.

The polyglycidyl ethers of the general formula shown have a number average molecular weight of about 340 to 5,000 and correspondingly an epoxy equivalent weight of 170 to 2,500. The epoxy resins may also be used in a completely or partially hydrogenated state. To control the film properties, some of the reactive groups of the epoxy resin may be reacted with other compounds. Suitable for this purpose are:

(a) carboxyl-containing compounds such as saturated or unsaturated monocarboxylic acids (for example benzoic acid, linoleic acid, 2-ethylhexoic acid, or Versatic acid), aliphatic, cycloaliphatic and/or aromatic dicarboxylic acids of various chain lengths (for example adipic acid, sebacic acid, isophthalic acid or dimeric fatty acids), hydroxyalkylcarboxylic acids (for example lactic acid, or dimethylolpropionic acid) and carboxyl-containing polyesters or (b) amino-containing compounds such as diethylamine or ethylhexylamine or diamines having secondary amino groups, such as, for example, N,N'-dialkylalkylenediamine, such as dimethylethylenediamine, N,N'-dialkylpolyoxyalkyleneamine, such as N,N'-dimethylpolyoxypropylenediamine, polyamino-amides, such as Versamides or the reaction product of one mole of diaminohexane with two moles of monoglycidyl ether or monoglycidyl ester, especially glycidyl esters of α-branched fatty acids, such as Versatic acid, or (c) hydroxyl-containing compounds, such as neopentylglycol, bisethoxylated neopentylglycol, neopentylglycol hydroxypivalate, dimethlyhydantoin-N,N'-diethanol, hexane-1,6-diol, hexane-2,5-diol, but-2-ene-1,4-diol, but-2-yne-1,4-diol, hex-3-yn-2,5-diol or other alkynediols, 1,4-bis(hydroxymethyl)-cyclohexane, 1,1-isopropylidene-bis-(p-phenoxy)-2-propanol, trimethylolpropane, pentaerythritol or aminoalcohols, such as triethanolamine, methyldiethanolamine or hydroxyl-containing alkylketimines such as aminomethylpropane-1,3-diol-methylisobutylketimine or tris(hydroxymethyl)-aminomethane-cyclohexanone ketimine as well as polyglycol ether, polyester-polyols, polyetherpolyols and polycaprolactone-polyols, of various functionalities and molecular weights.

Instead of using polyglycidyl ethers based on bisphenol A it is also possible to use polyglycidyl ethers based on other components, such as triglycidyl isocyanurate, heterocyclic diglycidyl compounds or diglycidyl-hydantoins.

Suitable as polyglycidyl esters are reaction products of, for example, bisglycidyl terephthalate or bisglycidyl isophthalate with, for example, bisphenol A. The epoxy equivalent weight of these products is between 200 and 2,500. To control the film properties, some of the remaining reactive glycidyl groups may be reacted with other compounds. Suitable for this purpose are for example the compounds mentioned above under a, b and c.

For the purposes of this invention, polyglycidylamines are glycidyl-containing resins which are obtained by introducing glycidyl groups (via, for example, epichlorohydrin) into $NH_2$-functional resins.

Also particularly suitable are copolymers of glycidyl acrylate and/or methacrylate or of any other glycidyl-bearing olefinically unsaturated polymerizable compound with esters of acrylic and/or methacrylic acid as well as polymerizable vinyl compounds which have a number average molecular weight of 700 to 10,000 and an epoxy equivalent weight of 600 to 3,000. The esters of acrylic acid with $C_2$- to $C_8$-alcohols and the esters of methacrylic acid with $C_1$- to $C_4$-alcohols are preferred. The copolymers may contain further monomers, such as hydroxyalkyl (meth)acrylate or (meth)acrylamide. The copolymerization is effected in well known form by solution, suspension or emulsion polymerization with the addition of freeradical initiators such as peroxides, hydroperoxides, peresters or thermolabile azo compounds and, if desired, molecular weight regulators.

For the purposes of this invention, partially epoxidized polybutadiene oils are reaction products which are obtained by reacting commercially available polybutadiene oils with peracids or organic acid/$H_2O_2$ mixtures. The method of preparation is described, for example, in Chemiker-Zeitung 95, 857 et seq. (1971).

The epoxy-containing resins are reacted with polyamines and/or an amino- and/or hydroxyl-containing ketimine. If the addition reaction is carried out with the compounds carrying the primary and secondary amino groups in the form of their ketimines, the reaction conditions should be controlled in such a way that no ketimine-decomposing substances remain in the reaction product. The preferred ketimines are reaction products of ketones and alkylamines or alkyldiamines containing hydroxyl or secondary amino groups and having the general structure $RNH-R-NH_2$ or $HO-R-NH_2$ respectively. The ketimines have for example the following structure:

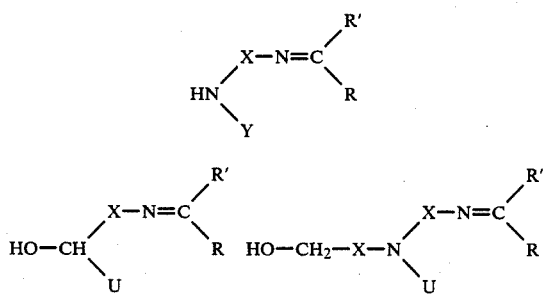

where:
$X = -(CR_2)_n-$
$R = -H, -R'$
$R' = -C_mH_{2m+1}, -C_6H_{11}$
$U = -R, -Y$

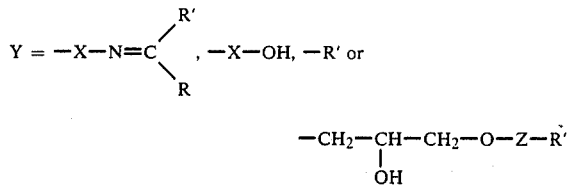

$Z = >CO, -X$
$n = 1-6$
$m = 1-12$

The ketones used for the reaction with the primary amino groups are generally aliphatic ketones, such as methyl ethyl ketone, diethyl ketone, methyl isobutyl ketone or ethyl n-propyl ketone and cycloaliphatic ketones such as cyclopentanone and cyclohexanone. The preferred aminoalkylamines and alkanolamines are chiefly diethylenetriamine, N-methylethylenediamine, N-methylpropylenediamine, N-aminoethylpiperazine, 2-aminoethanol, 1-aminopropan-2-ol, 1-aminopropan-3-ol, 2-amino-2-methylpropan1-ol, 3-amino-2,2-dimethylpropan-1-ol, 1,5-diaminopentan-3-ol or N-(2-aminoethyl)-N-(2-hydroxyethyl)-ethylenediamine.

The exothermic addition of the aminoketimines described above onto the epoxy groups of the base resin of binder component A is generally carried out at room temperature. To complete the reaction it is frequently finished off at temperatures between 50° and 125° C.

The secondary amines containing hydroxyl groups can be introduced into the molecule in similar fashion.

The base resin of binder component A can also be a base resin having at least 2 isocyanate groups. Resins containing isocyanate groups are preferably higher-functional polyisocyanates which are prepared by trimerization or oligomerization from diisocyanates or polyisocyanates and polyfunctional OH- or NH-containing compounds. Typical isocyanates are toluylene diisocyanate, hexamethylene diisocyanate, 4,4'-diphenylmethane diisocyanate, 4,4'-dicyclohexylmethane diisocyanate, 1,6-diisocyanato-2,2,4-trimethylhexane and 1-isocyanatomethyl-3-isocyanato-1,5,5-trimethylcyclohexane. It is furthermore possible to use with advantage isocyanate-containing prepolymers based on polyglycol ethers, polyester-polyols, polyetherpolyols, polycaprolactone-polyols, polycaprolactam-polyols or polyamino-amides.

Binder component B, the crosslinking agent, is a compound which contains at least 2 β-alkoxyalkyl ester groups. The crosslinking agent can be a low molecular weight compound or an appropriately substituted resin. If the esterification is performed not with an alcohol having an alkoxy group at the β-carbon atom but with alcohols such as methyl, ethyl or butyl alcohol, the amidation or transesterification reaction proceeds significantly more slowly.

The crosslinking rate is in this case too low, and the baked film is not sufficiently resistant to solvent. These disadvantages are bypassed if, as directed by the invention, β-alkoxylalkyl esters are used for the amidation or transesterification reaction. The compounds which form the crosslinking agent are preferably polyester resins, but it is also possible to use other compounds which contain free carboxyl groups and are accessible to esterification.

The crosslinking component is thus a poly(2-alkoxyalkyl)ester of a polycarboxylic acid. It can be advantageously prepared as follows. First of all, equivalent proportions of a dicarboxylic anhydride (phthalic anhydride, hexahydrophthalic anhydride, trimellitic anhydride or succinic anhydride) is reacted at temperatures below 145° C. with a polyol (glycerol, trimethylolpropane, pentaerythritol or dipentaerythritol). The resulting acid intermediate is then esterified to give the end product.

A further method of preparation consists in reacting a 2-alkoxyalcohol with equimolar amounts of a dicarboxylic anhydride to give the corresponding 2-alkoxyalkyl half-ester, which is subsequently reacted with polyglycidyl compounds in an equivalent ratio, based on the glycidyl groups. This last reaction can be advantageously carried out in the presence of catalysts of the type also customary for reactions of carboxylic acids with epoxy compounds. It is particularly advantageous to choose the ratio of acid half-ester to polyepoxy compound to be such that the β-hydroxy groups formed through the addition of the half-ester onto the epoxy groups are partly or wholly esterified by the remaining excess of half-ester in a condensation reaction at elevated temperatures, with or without catalysts.

Component B is advantageously a polyacrylate resin comprising the following monomers:
(a) 10-50% by weight of an alkyl acrylate having 1 to 18 carbon atoms in the alkyl radical and/or methacrylate having 2 to 18 carbon atoms in the alkyl radical,
(b) 0-60% by weight of methyl methacrylate,
(c) 0-35% by weight of styrene, α-methylstyrene, o- and/or p-chlorostyrene, p-tert.butylstyrene, vinyltoluene and/or or vinylcarbazole and
(d) 2-35% by weight of β-alkoxyalkyl acrylate and/or methacrylate or of any other olefinic unsaturated polymerizable compound containing β-alkoxyalkyl ester groups, the proportions of a, b, c and d adding up to 100%.

The binder mixture according to the invention can be in finely divided solid form or in the form of a solution in an organic solvent.

For electrocoating purposes it is necessary that, after protonation with acid, the binder mixture is in the form of an aqueous solution or dispersion. The water-solubility of the binder component is brought about by neutralizing the primary, secondary and/or tertiary amino groups therein with acids. Organic acids are particularly suitable acids. The amino groups are preferably neutralized with formic acid, acetic acid, malonic acid, lactic acid or citric acid.

Said acids can also be used if the solubilizing groups of the binder component are introduced by addition of an ammonium group onto the binder.

The degree of neutralization of the solubilizing groups is, based on these groups, between 0.2 and 1.0 equivalent and preferably between 0.25 and 0.6 equivalent of acid.

The neutralization can be carried out as follows. The acid is initially introduced into water, together with the dispersing auxiliary if one is used, and the resin solution is stirred into the water at room temperature or, if desired, at elevated temperatures. The acid, however, can also be added to the resin solution directly. The neutralized resin solution can then be stirred into the water, or it is also possible slowly to stir the water into the resin solution.

To control its viscosity, the deposition voltage, and the flow, the dispersion may contain up to 20% of organic solvent. If, as a result of the chosen method of preparation, the batch contains an excessive amount of solvent or even contains solvent which impairs the properties, it is possible to distil these solvents out of the resin solution before the dispersing, or they are distilled out of the aqueous dispersion. A very low organic solvent content is beneficial for the properties as a whole.

The solids content of a deposition bath which is made up on the basis of the dispersion according to the invention is 7-35 parts by weight, preferably 12-25 parts by weight. The deposition bath is at pH 4-8, preferably 5-7.5. The anodes of the deposition bath are non-corroding steel anodes or graphite anodes. The temperature of the made-up bath should be between 15° and 35° C., preferably between 20° and 30° C. The deposition period and voltage are so chosen that the desired film thickness is obtained.

After the deposition the coated article is rinsed off and is ready for baking.

Irrespective of the method chosen for applying the coating agents prepared on the basis of the binder mixture according to the invention, the paint film is crosslinked by baking at temperatures of 130° to 200° C. for 10-60 minutes, preferably at 150° to 180° C. for 15-30 minutes.

The amidation and/or esterification reaction may be additionally speeded up by means of suitable catalysts. Suitable for this purpose are in particular ammonium compounds such as benzyltrimethylammonium hydroxide, benzyltrimethylammonium chloride, trimethylcetylammonium bromide or tetraammonium iodide and organic tin compounds such as dibutyltin dilaurate and iron(III) acetylacetonate, zinc acetate, zinc 2-ethylhexoate, cobalt naphthenate, lead acetate or butyl titanate.

The pigment is introduced in well known fashion, namely by grinding the pigments and the customary additives such as fillers, corrosion inhibitors and antifoams in one of the two binder components. The grinding can be done in, for example, sand mills, ball mills or threeroll mills.

The make-up of the finish can be completed in commonly known fashion, namely by grinding the pigments and the customary additives, such as fillers, corrosion inhibitors and antifoams, either in the binder component or in the crosslinking component. This grinding can be done in, for example, sand mills, ball mills or threeroll mills.

Individual components A and B and, if used, component C can be mixed in the form of their concentrated solutions and then can be dispersed together. However, it is also possible to disperse components A and B individually, the pigments having been ground into A or B, and to mix the dispersions of the individual components in the required ratio.

The invention further relates to a process for preparing surface coatings by applying to a substrate in the form of a film, and baking, a coating agent which contains a binder mixture of an organic synthetic resin A and a crosslinking agent B, wherein said synthetic resin A is an epoxy resin, polyester resin or acrylate resin having a number average molecular weight of 500 to 20,000 and at least 0.2 equivalent per 100 g of resin of primary and/or secondary amino groups and/or hydroxyl groups, and said crosslinking agent B is an organic compound having at least 2 β-alkoxyalkyl ester groups per molecule.

Advantageous embodiments of the process according to the invention are given in the subclaims.

The invention also relates to the use of a binder mixture comprising an organic synthetic resin A and a crosslinking agent B for preparing surface coatings, wherein said synthetic resin A is an epoxy resin, polyester resin or acrylate resin having a number average molecular weight of 500 to 20,000 and at least 0.2 equivalent per 100 g of resin of primary and/or secondary amino groups and/or hydroxyl groups, and said crosslinking agent B is an organic compound having at least 2 β-alkoxyalkyl ester groups per molecule.

Advantageous embodiments of the use according to the invention are given in the subclaims.

Below the invention is explained in more detail by reference to illustrative embodiments.

Preparation of a β-alkoxyalkyl ester crosslinking agent 1

1,462 g of hexylglycol (10 moles) are introduced into a reaction vessel which can be heated with heatcarrying oil and is equipped with a water separator, a reflux condenser and a Raschig column in between, and 1,000 g of succinic anhydride (10 moles) are added with stirring, while inert gas is fed in as well. The reaction mixture is heated to 120° C., the temperature being briefly raised to 130° C. by the exothermic nature of the reaction. Said temperature is maintained until the acid number is 230 mg of KOH/g.

400 g of xylene, 5 g of N-cetyl-N,N,N-trimethylammonium bromide and 940 g of a bisphenol A epoxy resin having an epoxy equivalent weight of 188 (2.5 moles) are then added. The temperature is again raised to 130° C., in the course of 1 hour, and is maintained there until the epoxy value has dropped to zero. After addition of 2 g of p-toluenesulfonic acid solution (25% strength in n-propanol) the temperature is raised to 200° C. in the course of 4 hours during which the water of reaction being formed is continuously separated out. After a further raise to 220° C. the temperature is maintained until about 90 g of water have been separated off, and the acid number has dropped to below 2 mg of KOH/g of solid resin. The mixture is then cooled and discharged without dilution.

Solids content: 95.2% by weight (measured after 1-hour heating at 130° C.).

Acid number: 1.1 mg of KOH/g of solid resin.

Viscosity: 480 mPas (measured at 25° C. after dilution with methyl isobutyl ketone to 70% by weight).

Preparation of a β-alkoxyalkyl ester crosslinking agent 2

The crosslinking agent 1 is repeated, except that 1,141 g of glutaric anhydride are used in place of the succinic anhydride.

Solids content: 96.4% by weight (1 hour at 130° C.).
Acid number: 0.9 mg of KOH/g of solid resin.
Viscosity: 425 mPas (measured at 25° C. after dilution with methyl isobutyl ketone to 70% by weight).

EXAMPLE 1

Preparation of binder dispersion 1

1,786 g of a polyglycidyl ether based in bisphenol A and having an epoxy equivalent weight of 893 and 350 g of a 4:1 mixture of methyl isobutyl ketone and xylene are heated to 80° C. in a reaction vessel equipped with stirrer, reflux condenser and inert gas supply line. When all the contents have melted, 280 g of diethanolamine are added with stirring. The temperature rises to 105° C. as a result of the exothermic reaction and is maintained at that level for 2 hours. The clear resin solution then has added to it 940 g of crosslinking agent (Agent 1) and 160 g of hexylglycol and is homogenized at 80° C. for 15 minutes.

In the meantime a dispersing bath is prepared by adding 2,000 g of the resin mixture described above, which is still warm, with stirring to 37.4 g of glacial acetic acid, 42.1 g of auxiliary emulsifier solution and 1,288 g of deionized water. The result is a dispersion mixture having a 50% solids content, which is stirred for an additional 2 hours. 50.5 g of a lead(II) octoate solution (24% of Pb) are then stirred in, and the resulting mixture is gradually further diluted by adding 1,375.6 g of deionized water.

Solids content: 36.2% (1 hour at 130° C.).
AEQ base: 0.67 milliequivalent/g of solid.
MEQ acid: 0.38.
pH: 5.9.

EXAMPLE 2

Preparation of binder dispersion 2

The Example leading to binder dispersion 1 is repeated, except that the 208 g of diethanolamine are replaced by 352 g of a 70% strength solution of diethylenetriamine-bis(methylisobutylketimine) in methyl isobutyl ketone and 105 g of diethanolamine, which are added in that order.

The result is a binder dispersion having the following parameters:

Solids content: 33.4% (1 hour at 130° C.).
MEQ base: 1.32 milliequivalents/g of solid.
MEQ acid: 0.39 milliequivalent/g.

pH: 7.2.

EXAMPLE 3

Preparation of binder dispersion 3

Example 1 is repeated, except that crosslinking agent 1 is replaced by the same weight of crosslinking agent 2.
Parameters:
Solids content: 36.4% (1 hour at 130° C.).
MEQ base: 0.69 milliequivalent/g of solid.
MEQ acid: 0.39 milliequivalent/g of solid.
pH: 6.0.

EXAMPLE 4

Preparation of binder dispersion 4

Example 2 is repeated, except that crosslinking agent 1 is replaced by the same weight of crosslinking agent 2.
Parameters:
Solids content: 33.6% (1 hour at 130° C.).
MEQ base: 1.31 milliequivalents/g of solid.
MEQ acid: 0.42 milliequivalent/g of solid.
pH: 7.2

Preparation of a gray pigment paste

To 953 parts of a commercially available epoxy resin based on bisphenol A and having an epoxy equivalent weight of 890 are added 800 parts of butylglycol. The mixture is heated to 80° C. To this resin solution are then added 221 parts of a product crosslinked from 101 parts of diethanolamine and 120 parts of 80% strength aqueous lactic acid. The reaction is carried out at 80° C. until the acid number has dropped to below 1.

1,800 parts of this product are combined with 2,447 parts of deionized water, and this combination is mixed with 2,460 parts of $TiO_2$, 590 parts of an extender based on aluminum silicate, 135 parts of lead silicate and 37 parts of carbon black. This mixture is reduced in a mill to a Hegman fineness of 5–7. 1,255 parts of the deionized water are then added in order to achieve the desired paste consistency. This gray paste has a very long shelf-life.

Preparation of electrocoating baths

Coating baths are made up from the binder dispersions described above and the gray pigment paste described above.

A bath contains:
2,280 parts of deionized water
25 parts of 10% strength acetic acid
1,920 parts of binder dispersion
775 parts of pigment paste The paint films are deposited at a bath temperature of 26° C. in the course of 120 seconds by connecting zinc-phosphatized metal sheets as the cathode and coating them. The deposited films are cured at 185° C. in an air-circulation oven in the course of 20 minutes.

Deposition results

The deposition results are given in the following Tables.

| Deposition data | | | | |
|---|---|---|---|---|
| Binder dispersion | 1 | 2 | 3 | 4 |
| Deposition voltage | 300 | 280 | 310 | 290 |
| Film thickness (μm) | 17 | 19 | 18 | 19 |
| Physicotechnological parameters | | | | |
| Example | 1 | 2 | 3 | 4 |
| Erichsen deep-drawing (mm) | 5.5 | 5.0 | 6.7 | 6.3 |
| Cross hatch | 0 | 0 | 0 | 0 |
| Bending test | o.k. | o.k. | o.k. | o.k. |
| Impact (inch-pound) | 40 | 50 | 50 | 40 |

Preparation of a powder finish 64 g of diethanolamine are introduced into a reaction vessel and heated to 80° C. 1,482 g of a 75% strength solution of Epikote 1007 in methyl ethyl ketone are added in the course of 3 hours. The temperature is then raised to 90° C. and maintained there for one hour.

295 g of the crosslinking agent are then added. The components are thoroughly mixed, and the solvents are carefully removed in vacuo at 110° C. The resulting resin melt is poured into a copper trough and is allowed to cool down, and when cold it is broken into pieces and ground.

The resulting powder is homogenized in an extruder with 60% by weight of titanium dioxide (rutile type). The customary working-up produces a powder finish suitable for the electrostatic powder spraying process. The films are baked at 180° C. for 20 minutes. The result is white, shiny films.

What is claimed is:

1. A heat-curable binder consisting essentially of a mixture of an organic resin A free of epoxy groups and a cross-linking agent B wherein said organic resin A is selected from the group consisting of epoxy resins and mixtures of said epoxy resins with polyester resins and acrylate resins, said resin A having a number average molecular weight of 500 to 20,000 and per 100 grams of resin A having at least 0.2 equivalent groups selected from the group consisting of primary amino groups, secondary amino groups, hydroxyl groups and mixtures thereof and said cross-linking agent B is a substituted resin having at least two Beta-alkoxyalkyl ester groups per molecule and a number average molecular weight of 200 to 10,000.

2. A heat-curable binder consisting essentially of a mixture of an organic resin A free of epoxy groups and a cross-linking agent B wherein said organic resin A is selected from the group consisting of epoxy resins and mixtures of said epoxy resins with polyester resins and acrylate resins, said resin A having a number average molecular weight of 500 to 20,000 and per 100 grams of resin A having at least 0.2 equivalent groups selected from the group consisting of primary amino groups, secondary amino groups, hydroxyl groups and mixtures thereof and said cross-linking agent B is an organic compound having at least two Beta-alkoxyalkyl ester groups per molecule.

3. The binder of claim 1 or 2, wherein said organic resin A is an epoxy resin.

4. The binder of claim 1 or 2, wherein said organic resin A is a mixture of epoxy resins, polyester resins and acrylate resins.

5. The binder of claim 1 or 2, further comprising a component C selected from the group consisting of pigments, fillers, cross-linking catalysts, corrosion inhibitors and paint auxiliaries.

6. The binder mixture of claim 1 or 2, wherein the proportion of component A is 40 to 95% by weight and that of component B is 5–60% by weight, the proportions of components A and B adding up to 100%.

7. The binder mixture of claim 1 or 2, wherein component A has a number average molecular weight of 600 to 10,000.

8. The binder mixture of claim 1, wherein component B is a polyacrylate resin comprising the following monomers:
 (a) 10–50% by weight of an alkyl acrylate having 1 to 18 carbon atoms in the alkyl radical, alkyl methacrylate having 2 to 18 carbon atoms in the alkyl radical, or mixtures thereof;
 (b) 0–60% by weight of methyl methacrylate;
 (c) 0–35% by weight of styrene, α-methylstyrene, o-chlorostyrene, p-chlorostyrene, p-tert.-butylstyrene, vinyltoluene, vinylcarbazole, of mixtures thereof;
 (d) 2–35% by weight of β-alkoxyalkyl acrylate, β-alkoxyalkyl methacrylate, any other olefinic unsaturated polymerizable compound containing β-alkoxyalkyl ester groups, or mixtures thereof, the proportions of a, b, c and d adding up to 100%.

9. The binder mixture of claim 1 or 2, which is in finely divided solid form.

10. The binder mixture of claim 1 or 2, which is in the form of a solution in an organic solvent.

11. The binder mixture of claim 1 or 2, which, after protonation with acid, is in the form of an aqueous solution or dispersion.

* * * * *